United States Patent
Chen et al.

(10) Patent No.: US 9,796,796 B2
(45) Date of Patent: Oct. 24, 2017

(54) SELF-LIMITING CATALYST COMPOSITION WITH NO SILANE

(75) Inventors: Linfeng Chen, Sugarland, TX (US); Richard E. Campbell, Jr., Midland, MI (US)

(73) Assignee: W. R. Grace & Co.-Conn., Columbia, MD (US)

( * ) Notice: Subject to any disclaimer, the term of this patent is extended or adjusted under 35 U.S.C. 154(b) by 333 days.

(21) Appl. No.: 12/674,485

(22) PCT Filed: Aug. 20, 2008

(86) PCT No.: PCT/US2008/073678
§ 371 (c)(1),
(2), (4) Date: Feb. 22, 2010

(87) PCT Pub. No.: WO2009/029447
PCT Pub. Date: Mar. 5, 2009

(65) Prior Publication Data
US 2011/0124491 A1    May 26, 2011

Related U.S. Application Data

(60) Provisional application No. 60/957,911, filed on Aug. 24, 2007.

(51) Int. Cl.
| | | |
|---|---|---|
| C08F 4/64 | (2006.01) | |
| C08F 4/44 | (2006.01) | |
| B01J 37/00 | (2006.01) | |
| C08F 4/02 | (2006.01) | |
| C08F 10/06 | (2006.01) | |
| C08F 110/02 | (2006.01) | |
| C08F 110/06 | (2006.01) | |

(52) U.S. Cl.
CPC ............ C08F 10/06 (2013.01); *C08F 110/02* (2013.01); *C08F 110/06* (2013.01)

(58) Field of Classification Search
None
See application file for complete search history.

(56) References Cited

U.S. PATENT DOCUMENTS

| 4,277,370 A * | 7/1981 | Karayannis et al. ......... 502/105 |
|---|---|---|
| 4,310,439 A | 1/1982 | Langer |
| 4,563,512 A * | 1/1986 | Goodall ..................... 526/125.6 |
| 4,567,155 A | 1/1986 | Tovrog et al. |
| 4,634,687 A | 1/1987 | Fujita et al. |
| 5,968,865 A * | 10/1999 | Wilson et al. ................ 502/126 |
| 6,303,715 B1 * | 10/2001 | Kim et al. .................... 526/128 |
| 6,818,583 B1 * | 11/2004 | Morini et al. ................ 502/103 |
| 2003/0087755 A1 * | 5/2003 | Chen et al. ................... 502/118 |

FOREIGN PATENT DOCUMENTS

| EP | 0 035 889 A1 | 9/1981 |
|---|---|---|
| EP | 0 116 709 A1 | 8/1984 |
| EP | 0 155 716 A1 | 9/1985 |
| EP | 0 284 005 A2 | 9/1988 |
| JP | 55-127408 | 10/1980 |
| JP | 60-067508 | 4/1985 |
| JP | 63-234003 | 9/1988 |
| JP | 2003-206314 A | 7/2003 |
| JP | 2005-306918 A | 11/2005 |
| WO | 0052068 A1 | 9/2000 |

OTHER PUBLICATIONS

Machine translation of JP 2005-306918.
Cavallo et al., Key Internations in Heterogeneous Ziegler-Natta Catalyst System: Structure and Energetics of TiC14-Lewis Base Complexes, J. Phys. Chem. C, 2007, vol. 111, pp. 4412-4419.
Sacchi et al., Role of the Pair of Internal and External Donors in MgC12-Supported Ziegler-Natta Catalysts, Macromolecules, 1991, vol. 24, pp. 6823-6826.

\* cited by examiner

*Primary Examiner* — Yun Qian
(74) *Attorney, Agent, or Firm* — Lerner, David, Littenberg, Krumholz & Mentlik, LLP

(57) ABSTRACT

A catalyst composition for the polymerization of propylene is provided. The catalyst composition includes one or more Ziegler-Natta procatalyst compositions having one or more transition metal compounds and an internal electron donor, one or more aluminum containing cocatalysts, and a selectivity control agent (SCA). The SCA is a mixture of an activity limiting agent (ALA) and selectivity determining agent (SDA) such as a non-silane composition. The present catalyst composition is silane-free, has high catalyst activity and high stereoselectivity, and is self-extinguishing.

3 Claims, No Drawings

SELF-LIMITING CATALYST COMPOSITION WITH NO SILANE

REFERENCE TO RELATED APPLICATIONS

This application claims the benefit of U.S. Provisional Application No. 60/957,911, filed on Aug. 24, 2007; which application is fully incorporated herein by reference.

BACKGROUND

The present disclosure relates to stereoselective Ziegler-Natta catalyst compositions for use in polymerization reactions and propylene polymerization in particular.

It is known to incorporate a silane composition such as an alkoxysilane into a Ziegler-Natta catalyst system in order to improve selectivity and isotacticity control. Such selectivity control agents may further include an activity limiting agent such as an aromatic carboxylic acid ester to provide the catalyst system with a self-limiting property. However, it would be desirable to develop a self-limiting Ziegler-Natta catalyst system with improved catalyst activity and improved stereoselectivity that does not require an alkoxysilane.

SUMMARY

The present disclosure is directed to a catalyst composition with high catalyst activity and high stereoselectivity, that is self-extinguishing and does not contain silane. The present catalyst composition further yields a polypropylene homopolymer with high isotacticity, or a propylene containing polymer.

In an embodiment, the catalyst composition includes one or more Ziegler-Natta procatalyst compositions having one or more transition metal compounds and an internal electron donor, one or more aluminum containing cocatalysts, and a selectivity control agent (SCA). The SCA is a mixture of an activity limiting agent (ALA) and a selectivity determining agent (SDA). In an embodiment, the ALA is a carboxylic acid ester and the SDA is a non-silane composition. The catalyst composition is self-extinguishing.

In an embodiment, the internal electron donor may be a diether composition, a succinate composition, a diol ester, or an aromatic dicarboxylic acid ester. The internal electron donor and the non-silane composition may be the same or different.

The carboxylic acid ester may be an aromatic carboxylic acid ester, an aliphatic acid ester, or a fatty acid ester. In an embodiment, the carboxylic acid ester is ethyl p-ethoxybenzoate. The non-silane composition may be a diether composition, a succinate composition, or a piperidine composition. Nonlimiting examples of suitable SCAs include a mixture of ethyl p-ethoxy benzoate (ALA) and 2,2,6,6-tetramethylpiperidine (SDA); a mixture of diethyl 2,3-diisopropylsuccinate (SDA) and an aliphatic ester (ALA); and a mixture of 2,2-di-iso-butyl-1,3-dimethoxypropane (SDA) and an aliphatic ester (ALA).

The present disclosure provides another catalyst composition. In an embodiment, the catalyst composition includes one or more Ziegler-Natta procatalyst compositions having one or more transition metal compounds and an internal electron donor, one or more aluminum containing cocatalysts, and a selectivity control agent (SCA). The SCA is a mixture of a non-ester composition (ALA) and a non-silane composition (SDA). The catalyst composition is self-extinguishing.

In an embodiment, the non-ester composition is a diether composition such as 2,2-di-iso-butyl-1,3-dimethoxypropane (ALA). A nonlimiting example of the SCA is a mixture of 2,2,6,6-tetramethylpiperidine (SDA) and 2,2-di-iso-butyl-1,3-dimethoxypropane (ALA).

The present disclosure provides another catalyst composition. In an embodiment, the catalyst composition includes one or more Ziegler-Natta procatalyst compositions having one or more transition metal compounds and an internal electron donor, one or more aluminum containing cocatalysts, and a selectivity control agent (SCA). The SCA is a mixture of a first non-silane composition (SDA) and a second non-silane composition (SDA). The catalyst composition is self-extinguishing.

In an embodiment, the first non-silane composition is 2,2,6,6-tetramethylpiperidine and the second non-silane composition is diethyl 2,3-diisopropylsuccinate or 2,2-di-isobutyl-1,3-dimethoxypropane. In a further embodiment, the SCA may include an activity limiting agent. The ALA may be the same or different than the first non-silane composition and/or the second non-silane composition.

The present disclosure provides another catalyst composition. In an embodiment, the catalyst composition includes one or more Ziegler-Natta procatalyst compositions having one or more transition metal compounds and an internal election donor, one or more aluminum containing cocatalysts, and a selectivity control agent (SCA). The SCA is a mixture of a poly (alkene glycol) ester and a non-silane composition. The catalyst composition is self-extinguishing.

In an embodiment, the poly (alkene glycol) ester is a fatty acid ester.

In an embodiment, the non-silane composition is a diether composition, a succinate composition and/or a piperidine composition. In another embodiment, the molar ratio of aluminum to total SCA is from about 100:1 to about 0.5:1.

In an embodiment, any of the catalyst compositions disclosed herein may include a molar ratio of aluminum to total SCA from 0.5:1 to 4:1.

An advantage of the present disclosure is the provision of an improved catalyst composition.

An advantage of the present disclosure is the provision of a catalyst composition with improved stereoselectivity.

An advantage of the present disclosure is the provision of a catalyst composition with improved productivity.

An advantage of the present disclosure is the provision of a self-extinguishing catalyst composition that is free of silicon and/or free of a silane composition.

An advantage of the present disclosure is the provision of a polymerization process with reduced reactor fouling and reduced polymer agglomeration.

An advantage of the present disclosure is the production of a propylene containing polymer with high isotacticity and low xylene soluble content.

An advantage of the present disclosure is a catalyst composition that provides a low odor or an odor-free propylene-based polymer.

DETAILED DESCRIPTION

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, molecular weights and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron spectroscopy.

The present catalyst composition contains a Ziegler-Natta procatalyst composition, a cocatalyst, and a selectivity control agent (SCA), each of which shall be discussed in detail below. Any conventional Ziegler-Natta procatalyst may be used in the present catalyst composition as is commonly known in the art. In an embodiment, the Ziegler-Natta procatalyst composition contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof.

The transition metal compound has the general formula $TrX_x$ where Tr is the transition metal, X is a halogen or a $C_{1-10}$ hydrocarboxyl or hydrocarbyl group, and x is the number of such X groups in the compound in combination with a Group 2 metal compound. Tr may be a Group 4, 5 or 6 metal. In an embodiment, Tr is a Group 4 metal, such as titanium. X may be chloride, bromide, $C_{1-4}$ alkoxide or phenoxide, or a mixture thereof. In an embodiment, X is chloride.

Nonlimiting examples of suitable transition metal compounds that may be used to form the Ziegler-Natta procatalyst composition are $TiCl_4$, $ZrCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. In an embodiment, the transition metal compound is a titanium compound.

Nonlimiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. In an embodiment, the Group 2 metal compound is magnesium dichloride.

In a further embodiment, the Ziegler-Natta procatalyst composition is a mixture of titanium moieties supported on or otherwise derived from magnesium compounds. Suitable magnesium compounds include anhydrous magnesium chloride, magnesium chloride adducts, magnesium dialkoxides or aryloxides, or carboxylated magnesium dialkoxides or aryloxides. In an embodiment, the magnesium compound is a magnesium di($C_{1-4}$)alkoxide, such as diethoxymagnesium.

Nonlimiting examples of suitable titanium moieties include titanium alkoxides, titanium aryloxides, and/or titanium halides. Compounds used to prepare the Ziegler-Natta procatalyst composition include one or more magnesium-di($C_{1-4}$)alkoxides, magnesium dihalides, magnesium alkoxyhalides, or mixtures thereof and one or more titanium tetra($C_{1-4}$) alkoxides, titanium tetrahalides, titanium($C_{1-4}$) alkoxyhalides, or mixtures thereof.

A precursor composition may be used to prepare the Ziegler-Natta procatalyst composition as is commonly known in art. The precursor composition may be prepared by the chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula $Mg_d Ti(OR_e)_f X_g$ wherein $R_e$ is an aliphatic or aromatic hydrocarbon radical having 1 to 14 carbon atoms or COR' wherein R' is an aliphatic or aromatic hydrocarbon radical having 1 to 14 carbon atoms; each $OR_e$ group is the same or different; X is independently chlorine, bromine or iodine; d is 0.5 to 56, or 2-4; or 3; f is 2-116, or 5-15; and g is 0.5-116, or 1-3, or 2. The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. Removal of the alkanol from the solution used in the chlorination, results in precipitation of the solid precursor, having a desirable morphology and surface area. Moreover, the resulting precursor is particularly uniform particle sized and resistant to particle crumbling as well as degradation of the resulting procatalyst.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, other alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon or halohydrocarbon, especially at an elevated temperature greater than 100° C., or greater than 110° C., may be employed to remove labile species, especially $TiCl_4$.

In an embodiment, the Ziegler-Natta procatalyst composition includes a solid catalyst component obtained by (i) suspending a dialkoxy magnesium in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

In an embodiment, the Ziegler-Natta procatalyst composition includes a solid catalyst component obtained by (i) suspending a mixed magnesium/titanium compound of the formula $Mg_dTi(OR_e)_fX_g$ in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

The Ziegler-Natta procatalyst composition includes an internal electron donor. The internal electron donor provides tacticity control and catalyst crystallite sizing. Nonlimiting examples of suitable internal electron donors include succinates, diethers, diol esters, and aromatic dicarboxylic acid esters.

In an embodiment, the diether is a dialkyl di-ether compound and is represented by the following formula,

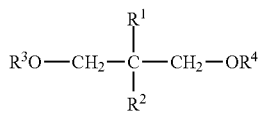

wherein $R^1$ to $R^4$ are independently of one another an alkyl, aryl or aralkyl group having up to 20 carbon atoms, which may optionally contain a group 14, 15, 16, or 17 heteroatom, and $R^1$ and $R^2$ may be a hydrogen atom. The dialkylether may linear or branched, and may include one or more or more of the following groups: alkyl, cycloaliphatic, aryl, alkylaryl or arylalkyl radicals with 1-18 carbon atoms, and hydrogen. Nonlimiting examples of suitable dialkyl diether compounds include dimethyl diether, diethyl diether, dibutyl diether, methyl ethyl diether, methyl butyl diether, methyl cyclohexyl diether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane and 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2,2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-n-propyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-n-propyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyl)octyl-1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-n-heptyl-2-n-pentyl-1,3-dimethoxypropane, 9,9-bis(methoxymethyl)fluorene, and 1-ethoxy-2-n-pentoxybenzene. In an embodiment, the internal electron donor is 1-ethoxy-2-n-pentoxybenzene.

In an embodiment, the internal donor is a succinate composition. The succinate composition may include one or more of the following groups: linear or branched alkyl, alkenyl, cycloalkyl, aryl, arylalkyl or alkylaryl group, optionally containing heteroatoms. One or more ring structures can be formed via one or both 2- and 3-position carbon atom. Nonlimiting examples of suitable succinates include diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl) succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-di(l-trifluoromethylethyl) succinate, diethyl 2,3-di(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetra-n-propylsuccinate, diethyl 2,3-diethyl-2,3-diisopropylsuccinate, diisobutyl 2,3-bis(trimethylsilyl) succinate, diisobutyl 2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis-(cyclohexylmethyl) succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-di(l, 1, 1-trifluoro-2-propyl)succinate, diisobutyl 2,3-n-propylsuccinate, diisobutyl 2,3-di(9-fluorenyl)succinate, diisobutyl 2-isopropyl-3-isobutylsuccinate, diisobutyl 2-tert-butyl-3-isopropylsuccinate, diisobutyl 2-isopropyl-3-cyclohexylsuccinate, diisobutyl 2-isopentyl-3-cyclohexylsuccinate, diisobutyl 2-n-propyl-3(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetra-n-propylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3-bis (2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-di(1,1,1-trifluoro-2-propyl)succinate, dineopentyl 2,3-n-propylsuccinate, dineopentyl 2,3-di(9-fluorenyl)succinate, dineopentyl 2-isopropyl-3-isobutylsuccinate, dineopentyl2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetra-n-propylsuccinate, dineopentyl 2,3-diethyl-2,3-diisopropylsuccinate, diethyl 1,2-cyclohexanedicarboxylate, and diethyl norbornene-2,3-dicarboxylate. In an embodiment, the internal electron donor is diethyl 2,3-diisoproplysuccinate.

In an embodiment, the internal donor is a diol ester. The diol ester is represented by the following formula,

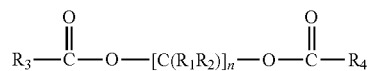

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom; n is an integer of 1-6. In another embodiment, $R_3$ and/or $R_4$ are phenyl or substituted phenyl groups. Nonlimiting examples of suitable dialkyl diether compounds include 1,2-propylene-glycol dibenzoate, 1,2-propylene-glycol di(p-chlorobenzoate), 1,2-propylene-glycol di(m-chlorobenzoate), 1,2-propylene-glycol di(p-bromobenzoate), 1,2-propylene-glycol di(o-bromobenzoate), 1,2-propylene-glycol di(p-methylbenzoate), 1,2-propylene-glycol di(p-tert-butylbenzoate), 1,2-propylene-glycol di(p-butylbenzoate), 2-methyl-1,2-propylene-glycol dibenzoate, 2-methyl-1,2-propylene-glycol di(p-chlorobenzoate), 2-menthyl-1,2-propylene-glycol di(m-chlorobenzoate), 2-methyl-1,2-propylene-glycol di(p-bromobenzoate), 2-methyl-1,2-propylene-glycol di(o-bromobenzoate), 2-methyl-1,2-propylene-glycol di(p-methylbenzoate), 2-methyl-1,2-propylene-glycol di(p-tert-butylbenzoate), 2-methyl-1,2-propylene-glycol di(p-butylbenzoate), 1,3-propylene-glycol dibenzoate, 2-methyl-1,3-propylene-glycol dibenzoate, 2-ethyl-1,3-propylene-glycol dibenzoate, 2-n-propyl-1,3-propylene-glycol dibenzoate, 2-n-butyl-1,3-propylene-glycol dibenzoate, 2,2-dimethyl-1,3-propylene-glycol dibenzoate, (R)-1-phenyl-1,3-propylene-glycol dibenzoate, (S)-1-phenyl-1,3-propylene-glycol dibenzoate, 1, 3-diphenyl-1,3-propylene-glycol dibenzoate, 2-methyl-1,3-diphenyl-1,3-propylene-glycol dibenzoate, 2,2-dimethyl-1,3-diphenyl-1,3-propylene-glycol dibenzoate, 2-ethyl-1,3-di(tert-butyl)-1, 3-propylene-glycol dibenzoate, 2-n-butyl-2-ethyl-1,3-propylene-glycol dibenzoate, 2,2-diethyl-1, 3-propylene-glycol dibenzoate, 2-dimethoxymethyl-1,3-propylene-glycol dibenzoate, 2-methyl-2-n-propyl-1,3-propylene-glycol dibenzoate, 2-isoamyl-2-isopropyl-1,3-propylene-glycol dibenzoate, 2-isoamyl-2-isopropyl-1,3-propylene-glycol di(p-chlorobenzoate), 2-isoamyl-2-isopropyl-1,3-propylene-glycol di(m-chlorobenzoate), 2-isoamyl-2-isopropyl-1 3-propylene-glycol di(p-methoxybenzoate), 2-isoamyl-2-isopropyl-1, 3-propylene-glycol di(p-methylbenzoate), 2,2-diisobutyl-1,3-propylene-glycol dibenzoate, 1, 3-diisopropyl-1,3-propylene-glycol di(4-n-butylbenzoate), 2-ethyl-2-methyl-1,3-propylene-glycol dibenzoate, 2,2-dimethyl-1,3-propylene-glycol dibenzoate, 1,2-butylene-glycol dibenzoate, 2-methyl-1,3-butylene-glycol dibenzoate, 2,3-dimethyl-1,2-butylene-glycol dibenzoate, 2, 3-dimethyl-1,2-butylene-glycol di(p-chlorobenzoate), 2,3,3-trimethyl-1,2-butylene-glycol dibenzoate, 2,3,3-trimethyl-1 3-butylene-glycol di(p-chlorobenzoate), 1,2-butylene-glycol di(p-chlorobenzoate), 2,3-butylene-glycol dibenzoate, 2,3-butylene-glycol di(o-bromobenzoate), 2,3-butylene-glycol di(methylbenzoate), 2,3-butylene-glycol di(m-chlorobenzoate), 2-methyl-2,3-butylene-glycol dibenzoate, 2-methyl-2, 3-butylene-glycol di(o-bromobenzoate), 2-methyl-2,3-butylene-glycol di(methylbenzoate), 2-methyl-2,3-butylene-glycol di(m-chlorobenzoate), 2,3-dimethyl-2,3-butylene-glycol dibenzoate, 2, 3-dimethyl-2, 3-butylene-glycol di(o-bromobenzoate), 2, 3-dimethyl-2,3-butylene-glycol di(methylbenzoate), 2, 3-di methyl-2,3-butylene-glycol di(m-chlorobenzoate), 2-methyl-1-phenyl-1,3-butylene-glycol dibenzoate, 1,4-butylene-glycol dibenzoate, 2,3-diisopropyl-1 3-butylene-glycol dibenzoate, 2,3-dimethyl-1,4-butylene-glycol dibenzoate, 2,3-diethyl-1,4-butylene-glycol dibenzoate, 2,3-dibutyl-1,4-butylene-glycol dibenzoate, 4,4,4-trifluoro-1-(2-naphthyl)-1,3-butylene-glycol dibenzoate, 2,3-pentanediol dibenzoate, 2-methyl-2,3-pentanediol dibenzoate, 3-methyl-2,3-pentanediol dibenzoate, 4-methyl-2,3-pentanediol dibenzoate, 2,3-dimethyl-2,3-pentanediol dibenzoate, 2,4-dimethyl-2,3-pentanediol dibenzoate, 3,4-dimethyl-2,3-pentanediol dibenzoate, 4,4-dimethyl-2,3-pentanediol dibenzoate, 2,3,4-trimethyl-2,3-pentanediol dibenzoate, 2,4,4-trimethyl-2,3-pentanediol dibenzoate, 3,4,4-trimethyl-2,3-pentanediol dibenzoate, 2,3,4,4-tetramethyl-2,3-pentanediol dibenzoate, 3-ethyl-2,3-pentanediol dibenzoate, 3-ethyl-2-methyl-2,3-pentanediol dibenzoate, 3-ethyl-2,4-dimethyl-2,3-pentanediol dibenzoate, 3-ethyl-2,4,4-trimethyl-2,3-pentanediol dibenzoate, 2,4-pentanediol dibenzoate, 3-methyl-2,4-pentanediol dibenzoate, 3-ethyl-2,4-pentanediol dibenzoate, 3-n-propyl-2,4-pentanediol dibenzoate, 3-n-butyl-2,4-pentanediol dibenzoate, 3,3-dimethyl-2,4-pentanediol dibenzoate, (2S, 4S)-(+)-2,4-pentanediol dibenzoate, (2R, 4R)-(+)-2,4-pentanediol dibenzoate, 2,4-pentanediol di(p-chlorobenzoate), 2,4-pentanediol di(m-chlorobenzoate), 2,4-pentanediol di(p-bromobenzoate), 2,4-pentanediol di(o-bromobenzoate), 2,4-pentanediol di(p-methylbenzoate), 2,4-pentanediol di(p-tert-butyl benzoate), 2,4-pentanediol di(p-n-butylbenzoate), 2-methyl-1,3-pentanediol dibenzoate, 2-methyl-1,3-pentanediol di(p-chlorobenzoate), 2-methyl-1,3-pentanediol di(p-methylbenzoate), 2-n-butyl-1,3-pentanediol di(p-methylbenzoate), 2-methyl-1,3-pentanediol di(p-tert-butylbenzoate), 2,2-dimethyl-1,3-pentanediol dibenzoate, 2-ethyl-1,3-pentanediol dibenzoate, 2-n-butyl-1,3-pentanediol dibenzoate, 2-allyl-1,3-pentanediol dibenzoate, 2-methyl-1,3-pentanediol dibenzoate, 2-ethyl-1,3-pentanediol dibenzoate, 2-n-propyl-1,3-pentanediol dibenzoate, 2-n-butyl-1,3-pentanediol dibenzoate, 1,3-pentanediol di(p-chlorobenzoate), 1,3-pentanediol di(m-chlorobenzoate), 1,3-pentanediol di(p-bromobenzoate), 1,3-pentanediol di(o-bromobenzoate), 1,3-pentanediol di(p-methylbenzoate), 1,3-pentanediol di(p-tert-butylbenzoate), 1,3-pentanediol di(p-n-butylbenzoate), 2,2,4-trimethyl-1,3-pentanediol dibenzoate, 3-methyl-1-trifluoromethyl-2,4-pentanediol dibenzoate, 2,4-pentanediol di(p-fluoromethylbenzoate), 2,4-pentanediol di(2-furancarboxylate), 3-n-butyl-3-methyl-2,4-pentanediol dibenzoate, 2,2-dimethyl-1,5-pentanediol dibenzoate, 1,5-diphenyl-1,5-pentanediol dibenzoate, 2,3-hexanediol dibenzoate, 2-methyl-2,3-hexanediol dibenzoate, 3-methyl-2,3-hexanediol dibenzoate, 4-methyl-2,3-hexanediol dibenzoate, 5-methyl-2,3-hexanediol dibenzoate 2,3-dimethyl-2,3-hexanediol dibenzoate, 2,4-dimethyl-2,3-hexanediol dibenzoate, 2,5-dimethyl-2, 3-hexanediol dibenzoate, 3,4-dimethyl-2,3-hexanediol dibenzoate, 3,5-dimethyl-2,3-hexanediol dibenzoate, 4,4-dimethyl-2,3-hexanediol dibenzoate, 4,5-dimethyl-2,3-hexanediol dibenzoate, 5,5-dimethyl-2,3-hexanediol dibenzoate, 2,3,4-trimethyl-2,3-hexanediol dibenzoate, 2,3,5-trimethyl-2,3-hexanediol dibenzoate, 2,4,4-trimethyl-2,3-hexanediol dibenzoate, 2,4,5-trimethyl-2,3-hexanediol dibenzoate, 2,5, 5-trimethyl-2,3-hexanediol dibenzoate, 3,4, 4-trimethyl-2,3-hexanediol dibenzoate, 3,4,5-trimethyl-2,3-hexanediol dibenzoate, 3,5,5-trimethyl-2,3-hexanediol dibenzoate, 2,3, 4,4-tetramethyl-2,3-hexanediol dibenzoate, 2,3,4,5-tetramethyl-2,3-hexanediol dibenzoate, 2,3,5,5-tetramethyl-2,3-hexanediol dibenzoate, 3-ethyl-2,3-hexanediol dibenzoate, 3-n-propyl-2,3-hexanediol dibenzoate, 3-isopropyl-2,3-hexanediol dibenzoate, 4-ethyl-2,3-hexanediol dibenzoate, 3-ethyl-2-methyl-2, 3-hexanediol dibenzoate, 4-ethyl-2-methyl-2,3-hexanediol dibenzoate, 2-methyl-3-n-propyl-2, 3-hexanediol dibenzoate, 4-ethyl-3-methyl-2,3-hexanediol dibenzoate, 3,4-diethyl-2,3-hexanediol dibenzoate, 4-ethyl-3-n-propyl-2,3-hexanediol dibenzoate, 3-ethyl-2,4-dimethyl-2,3-hexanediol dibenzoate, 3-ethyl-2,5-dimethyl-2, 3-hexanediol dibenzoate, 3-ethyl-2,4,4-trimethyl-2,3-hexanediol dibenzoate 3-ethyl-2,4,5-trimethyl-2,3-hexanediol dibenzoate, 2,5-dimethyl-3-n-propyl-2,3-hexanediol dibenzoate, 2,4,4-trimethyl-3-n-propyl-2,3-hexanediol dibenzoate, 2,5,5-trimethyl-3-n-propyl-2,3-hexanediol dibenzoate, 2,4,5-trimethyl-3-n-propyl-2,3-hexanediol dibenzoate, 3,4-diethyl-2-methyl-2,3-hexanediol dibenzoate, 2-ethyl-1,3-hexanediol dibenzoate, 2-n-propyl-1,3-hexanediol dibenzoate, 2-n-butyl-1,3-hexanediol dibenzoate, 4-ethyl-1,3-hexanediol dibenzoate, 4-methyl-1,3-hexanediol dibenzoate, 3-methyl-1,3-hexanediol dibenzoate, 3-ethyl-1,3-hexanediol dibenzoate, 2,2,4,6,6-pentamethyl-3,5-hexanediol dibenzoate, 2,5-hexanediol dibenzoate, 2,5-dimethyl-2,5-hexanediol dibenzoate, 2,5-dimethyl-hexa-3-yne-2,5-diol dibenzoate, hexa-3-yne-2,5-diol dibenzoate (T), hexa-3-yne-2,5-diol dibenzoate (S), hexa-3-yne-2,5-diol di(2-furancarboxylate), 3,4-di-n-butyl-1,6-hexanediol dibenzoate, 1,6-hexanediol dibenzoate, hepta-6-ene-2,4-diol dibenzoate, 2-methyl-hepta-6-ene-2,4-diol dibenzoate, 3-methyl-hepta-6-ene-2,4-diol dibenzoate, 4-methyl-hepta-6-ene-2,4-diol dibenzoate, 5-methyl-hepta-6-ene-2,4-diol dibenzoate, 6-methyl-hepta-6-ene-2,4-diol dibenzoate, 3-ethyl-hepta-6-ene-2,4-diol dibenzoate, 4-ethyl-hepta-6-ene-2,4-diol dibenzoate, 5-ethyl-hepta-6-ene-2,4-diol dibenzoate, 6-ethyl-hepta-6-ene-2,4-diol dibenzoate, 3-n-propyl-hepta-6-ene-2,4-diol dibenzoate, 4-n-propyl-hepta-6-ene-2,4-diol dibenzoate, 5-n-propyl-hepta-6-ene-2,4-diol dibenzoate, 6-n-propyl-hepta-6-ene-2,4-diol dibenzoate, 3-n-butyl-hepta-6-ene-2,4-diol dibenzoate, 4-n-butyl-hepta-6-ene-2,4-diol dibenzoate, 5-n-butyl-hepta-6-ene-2,4-diol dibenzoate, 6-n-butyl-hepta-6-ene-2,4-diol dibenzoate, 3, 5-dimethyl-hepta-6-ene-2,4-diol dibenzoate, 3,5-diethyl-hepta-6-ene-2,4-diol dibenzoate, 3, 5-di-n-propyl-hepta-6-ene-2,4-diol dibenzoate, 3,5-di-n-butyl-hepta-6-ene-2,4-diol dibenzoate, 3, 3-dimethyl-hepta-6-ene-2,4-diol dibenzoate, 3,3-diethyl-hepta-6-ene-2,4-diol dibenzoate, 3,3-di-n-propyl-hepta-6-ene-2,4-diol dibenzoate, 3,3-di-n-butyl-hepta-6-ene-2,4-diol dibenzoate, 3,5-heptanediol dibenzoate, 2-methyl-3,5-heptanediol dibenzoate, 3-methyl-3,5-heptanediol dibenzoate, 4-methyl-3,5-heptanediol dibenzoate, 5-methyl-3,5-heptanediol dibenzoate, 6-methyl-3,5-heptanediol dibenzoate, 3-ethyl-3, 5-heptanediol dibenzoate, 4-ethyl-3, 5-heptanediol dibenzoate, 5-ethyl-3,5-heptanediol dibenzoate, 3-n-propyl-3,5-heptanediol dibenzoate, 4-n-propyl-3,5-heptanediol dibenzoate, 3-n-butyl-3,5-heptanediol dibenzoate, 2,3-dimethyl-3,5-heptanediol dibenzoate, 2,4-dimethyl-3,5-heptanediol dibenzoate, 2,5-dimethyl-3,5-heptanediol dibenzoate, 2,6-dimethyl-3,5-heptanediol dibenzoate, 3,3-dimethyl-3,5-heptanediol dibenzoate, 4,4-dimethyl-3,5-heptanediol dibenzoate, 6,6-dimethyl-3,5-heptanediol dibenzoate, 3,4-dimethyl-3,5-heptanediol dibenzoate, 3,5-dimethyl-3,5-heptanediol dibenzoate, 3,6-dimethyl-3,5-heptanediol dibenzoate, 4,5-dimethyl-3,5-heptanediol dibenzoate, 4,6-dimethyl-3,5-heptanediol dibenzoate, 4,4-dimethyl-3,5-heptanediol dibenzoate, 6,6-dimethyl-3, 5-heptanediol dibenzoate, 3-ethyl-2-methyl-3,5-heptanediol dibenzoate, 4-ethyl-2-methyl-3,5-heptanediol dibenzoate, 5-ethyl-2-methyl-3,5-heptanediol dibenzoate, 3-ethyl-3-methyl-3,5-heptanediol dibenzoate, 4-ethyl-3-methyl-3,5-heptanediol dibenzoate, 5-ethyl-3- methyl-3,5-heptanediol dibenzoate, 3-ethyl-4-methyl-3,5-heptanediol dibenzoate, 4-ethyl-4-methyl-3,5-heptanediol dibenzoate, 5-ethyl-4-methyl-3,5-heptanediol dibenzoate, 2-methyl-3-n-propyl-3,5-heptanediol dibenzoate, 2-methyl-4-n-propyl-3,5-heptanediol dibenzoate, 2-methyl-5-n-propyl-3, 5-heptanediol dibenzoate, 3-methyl-3-n-propyl-3,5-heptanediol dibenzoate, 3-methyl-4-n-propyl-3,5-heptanediol dibenzoate, 3-methyl-5-n-propyl-3,5-heptanediol dibenzoate, 4-methyl-3-n-propyl-3,5-heptanediol dibenzoate, 4-methyl-4-n-propyl-3,5-heptanediol dibenzoate, 4-methyl-5-n-propyl-3,5-heptanediol dibenzoate, 6-methyl-2,4-heptanediol di(p-chlorobenzoate), 6-methyl-2,4-heptanediol di(p-methylbenzoate), 6-methyl-2,4-heptanediol di(m-methyl benzoate), 3,6-dimethyl-2,4-heptanediol dibenzoate, 2,2,6, 6-tetramethyl-3,5-heptanediol dibenzoate, 2,6-dimethyl-2,6-heptanediol dibenzoate, 4-methyl-3,5-octandiol dibenzoate, 4-ethyl-3,5-octandiol dibenzoate, 4-n-propyl-3,5-octandiol dibenzoate, 5-n-propyl-3,5-octandiol dibenzoate, 4-n-butyl-3,5-octandiol dibenzoate, 4,4-dimethyl-3,5-octandiol dibenzoate, 4,4-diethyl-3,5-octandiol dibenzoate, 4,4-di-n-propyl-3,5-octandiol dibenzoate, 4-ethyl-4-methyl-3, 5-octandiol dibenzoate, 3-phenyl-3,5-octandiol dibenzoate, 3-ethyl-2-methyl-3,5-octandiol dibenzoate, 4-ethyl-2-methyl-3,5-octandiol dibenzoate, 5-ethyl-2-methyl-3,5-octandiol dibenzoate, 6-ethyl-2-methyl-3,5-octandiol dibenzoate, 5-methyl-4,6-nonandiol dibenzoate, 5-ethyl-4,6-nonandiol dibenzoate, 5-n-propyl-4,6-nonandiol dibenzoate, 5-n-butyl-4,6-nonandiol dibenzoate, 5,5-dimethyl-4,6-nonandiol dibenzoate, 5,5-diethyl-4,6-nonandiol dibenzoate, 5,5-di-n-propyl-4,6-nonandiol dibenzoate, 5,5-di-n-butyl-4, 6-nonandiol dibenzoate, 4-ethyl-5-methyl-4,6-nonandiol dibenzoate, 5-phenyl-4,6-nonandiol dibenzoate, 4,6-nonandiol dibenzoate, 1,1-cyclohexane dimethanol dibenzoate, 1,2-cyclohexandiol dibenzoate, 1,3-cyclohexandiol dibenzoate, 1,4-cyclohexandiol dibenzoate, 1, 1-bis(benzoyloxyethyl)cyclohexane, 1,4-bis(benzoyloxymethyl)cyclohexane, 1,1-bis(benzoyloxymethyl)-3-cyclohexene, 9,9-bis(benzoyloxymethyl)fluorine, 9,9-bis((m-methoxybenzoyloxy)methyl)fluorine, 9,9-bis((m-chlorobenzoyloxy)methyl)fluorine, 9, 9-bis((p-chlorobenzoyloxy)methyl)fluorine, 9,9-fluorenedimethanol dibenzoate, 1,2-phenylene dibenzoate, 1,3-phenylene dibenzoate, 1,4-phenylene dibenzoate, 2,2'-biphenylene dibenzoate, bis(2-benzoyloxynaphthyl)methane, 1,2-xylenediol dibenzoate, 1,3-xylenediol dibenzoate, 1,4-xylenediol dibenzoate, 2,2'-biphenyldimethanol dibenzoate, 2,2'-binaphthyldimethanol dibenzoate, pentaerythritol tetrabenzoate 1,2,3-propanetriol tribenzoate and any combination of the foregoing.

In an embodiment, the internal donor is an aromatic dicarboxylic acid ester. Nonlimiting examples of suitable aromatic dicarboxylic acid esters include halides or anhydrides or (poly)alkyl ether derivatives thereof, especially $C_{2-8}$ dialkyl esters of phthalic or terephthalic acid, phthaloyl dichloride, phthalic anhydride, and $C_{1-4}$ (poly)alkyl ether derivatives thereof. In an embodiment, the internal electron donor is diisobutyl phthalate.

The Ziegler-Natta procatalyst composition may also include an inert support material. The support may be an inert solid which does not adversely alter the catalytic performance of the transition metal compound. Examples include metal oxides, such as alumina, and metalloid oxides, such as silica.

The catalyst for use with the foregoing Ziegler-Natta procatalyst composition is an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA). The molar ratio of aluminum to titanium of from 35:1 to 50:1. In an embodiment, the molar ratio of aluminum to titanium to 45:1.

The catalyst composition includes a selectivity control agent (SCA). The SCA is a mixture of (i) one or more activity limiting agents (ALA) and/or (ii) one or more selectivity determining agents (SDA). As used herein, an "activity limiting agent" is a composition that decreases catalyst activity as the catalyst temperature rises above a threshold temperature. A "selectivity determining agent" is a composition that provides selectivity control.

In an embodiment, the SDA is a non-silane composition. As used herein, a "non-silane composition" is a molecule or compound that does not include an Si atom, or a Si—O moiety, or an alkoxysilane group. In other words, the non-silane composition lacks, or is otherwise free of, silicon and/or an alkoxysilane. When the SCA is solely the SDA non-silane composition and the SDA-to-titanium ratio is 5-50:1, the catalyst composition yields a propylene-based polymer (i.e., a polypropylene homopolymer) with a xylene solubles content of less than about 6 wt %.

Silane compositions having the general formula $SiR_m(OR')_{4-m}$ (I) are commonly utilized in Ziegler-Natta catalyst systems for improved productivity and stereoselectivity. Applicants have surprisingly discovered that in the present self-extinguishing SCA compositions, the SDAs improve stereoselectivity and productivity and do not require an alkoxysilane composition (i.e., the SCA is silicon-free). This discovery is advantageous as catalyst stereoselectivity and catalyst productivity are no longer restricted to the incorporation of a silane-based compound in the self-extinguishing catalyst composition.

In an embodiment, the non-silane composition may be a diether composition, a succinate composition, or a piperidine composition. The diether composition may be any dialkyl diether as discussed above. The internal donor and the SCA may each contain a diether composition, the diether composition being the same or different. In an embodiment, non-silane composition is 2,2-diisobutyl-1,3-dimethoxypropane.

In an embodiment, the non-silane composition may be a succinate composition. The succinate composition may be any succinate as previously discussed herein. The internal donor and the SCA may each contain a succinate composition, the succinate composition being the same or different. A nonlimiting example of a succinate composition suitable as the non-silane composition is diethyl 2,3-diisopropylsuccinate.

In an embodiment, the non-silane composition may be a piperidine composition. Nonlimiting examples of suitable piperidine compounds include 2,6-substituted piperidines such as 2,6-dimethylpiperidine and 2,2,6,6-tetramethylpiperidine and 2,5-substituted piperidines. In a further embodiment, the piperidine compound is 2,2,6,6-tetramethylpiperidine.

The SCA also includes an ALA. The ALA may be an aromatic carboxylic acid ester, an aliphatic acid ester, or a non-ester composition. In an embodiment, the ALA may be an aromatic carboxylic acid or a derivative thereof, an aliphatic ester, or a non-ester composition. Nonlimiting examples of suitable aromatic carboxylic acids include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15, 16 or 17 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15,16 or 17 heteroatoms containing substituents and $C_{1-20}$ (poly)hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate. In an embodiment, the aromatic monocarboxylic acid is ethyl p-ethoxybenzoate.

In an embodiment, the ALA is an aliphatic acid ester. The aliphatic acid ester may be a fatty acid ester, may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15, or 16 or 17 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ alkyl mono- or polycarboxylate derivatives of $C_{2-100}$ (poly)glycols or $C_{2-100}$ (poly) glycol ethers. In a further embodiment, the $C_4$-$C_{30}$ aliphatic ester may be isopropyl myristate, and/or di-n-butyl sebacate.

In an embodiment the ALA is a poly(alkene glycol) ester. Nonlimiting examples of suitable poly(alkene glycol) esters include (poly)(alkylene glycol) mono- or diacetates; (poly) (alkylene glycol) mono- or di-myristates; fatty acid esters such as (poly)(alkylene glycol) mono- or di-laurates; (poly) (alkylene glycol) mono- or di-oleates; glyceryl tri(acetate), glyceryl tri-ester of $C_{2-40}$ aliphatic carboxylic acids; poly (ethylene glycol) esters; glycerides of linoleic, oleic, palmitic and stearic acids, and mixtures thereof; and any combination of the foregoing. In another embodiment, the fatty acid ester is a coco fatty acid ester commercially available as S-191 from Chem Service, Inc., West Chester, Pa.

In an embodiment the ALA is a non-ester composition. As used herein, a "non-ester composition" is a molecule or compound that is free of an ester functional group. In other words, the "non-ester composition" does not contain the following functional group.

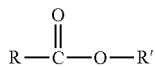

In an embodiment, the non-ester composition may be a dialkyl diether composition. The dialkyl diether composition may be any of the foregoing dialkyl ether compounds. In an embodiment, the ALA is 2,2-diisobutyl-1,3-dimethoxypropane (ALA).

In an embodiment, a catalyst composition is provided. The catalyst composition includes one or more Ziegler-Natta procatalyst compositions having one or more transition metal compounds and an internal electron donor, one or more aluminum containing cocatalysts and a selectivity control agent (SCA). The internal electron donor may be any internal electron donor as disclosed herein. The SCA is a mixture of a carboxylic acid ester (ALA) and a non-silane composition (SDA). The catalyst composition is self-extinguishing.

The SCA may include any carboxylic acid ester and one or more non-silane compositions as previously disclosed herein. The carboxylic acid ester may be ethyl-p-ethoxybenzoate. Nonlimiting examples of suitable SCA having a carboxylic acid ester and a non-silane composition include ethyl p-ethoxy benzoate and 2,2,6,6-tetramethylpiperidine; an aliphatic ester (such as a fatty acid ester) and diethyl 2,3-diisopropylsuccinate; and an aliphatic ester (such as a fatty acid ester) and 2,2-diisobutyl-1,3-dimethoxypropane.

In an embodiment, another catalyst composition is provided. The catalyst composition includes one or more Ziegler-Natta procatalyst compositions having one or more transition metal compounds and an internal electron donor, one or more aluminum containing cocatalysts and a selectivity control agent (SCA). The internal electron donor may be any internal electron donor as disclosed herein. The SCA is a mixture of a non-ester composition (ALA) and a non-silane composition (SDA). The catalyst composition is self-extinguishing.

The SCA may include any non-ester composition and one or more non-silane compositions as previously disclosed herein. In an embodiment, the non-ester composition is a diether composition. A nonlimiting example of a suitable non-ester composition is 2,2-diisobutyl-1,3-dimethoxypropane. In a further embodiment, the SCA is a mixture of 2,2,6,6-tetramethylpiperidine and 2,2-diisobutyl-1,3-dimethoxypropane.

In an embodiment, another catalyst composition is provided. The catalyst composition includes one or more Ziegler-Natta procatalyst compositions having one or more transition metal compounds and an internal electron donor, one or more aluminum containing cocatalysts and a selectivity control agent (SCA). The internal electron donor may be any internal electron donor as disclosed herein. The SCA is a mixture of a first SDA and a second SDA. The catalyst composition may optionally include an ALA. The catalyst composition is self-extinguishing.

In an embodiment, the first SDA and the second SDA are respectively a first non-silane composition and a second non-silane composition. The first non-silane composition and the second non-silane composition may be any combination of different non-silane compositions as disclosed herein. In an embodiment, the first non-silane composition is 2,2,6,6-tetramethylpiperidine and the second non-silane composition is either diethyl 2,3-diisopropylsuccinate or 2,2-diisobutyl-1,3-dimethoxypropane.

In an embodiment, the SCA includes an ALA. The ALA may be any activity limiting agent as disclosed herein. The ALA may be the same or different than the first non-silane composition and/or the second non-silane composition. In an embodiment, the ALA is an aromatic carboxylic acid ester such as ethyl p-ethoxybenzoate.

In any of the foregoing embodiments, the molar ratio of aluminum to total SCA may be from 0.5:1 to 4:1 (or any value therebetween), or from 1:1 to 3:1, or from 2:1 to 3:1 or less than or equal to 2.5:1. As used herein, the "SCA" or the "total SCA" is the combined amount of the ALA (if present) and the SDA present in the catalyst composition. In an embodiment, the molar ratio of aluminum to total SCA is 3:1.

The Applicants have surprisingly discovered that controlling the aluminum to SCA total molar ratio between 0.5:1 to 4:1 advantageously yields a catalyst system that exhibits high productivity, with excellent operability and is self-extinguishing. As used herein, a "self-extinguishing" catalyst is a catalyst that demonstrates decreased activity at a temperature greater than about 100° C. In addition, as a practical standard, if a polymerization process, especially a fluidized bed, gas-phase polymerization, running at normal processing conditions is capable of interruption and resulting collapse of the bed without adverse consequences with respect to agglomeration of polymer particles, the catalyst composition is said to be "self-extinguishing."

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included. That is, the catalyst activity is "normalized" to compensate the decreased solubility compared to the lower temperature, especially a 67° C. standard. The "normalized" activity at temperature T, or $A_T$, is defined as the measured activity or (weight polymer/weight catalyst/hr) at temperature T, multiplied by a concentration correction factor, [P(67)]/[P(T)], where [P(67)] is the propylene concentration at 67° C. and [P(T)] is the propylene concentration at temperature T. The equation for normalized activity is provided below.

$$\text{Normalized Activity } (A) = \frac{[P(67)]}{[P(T)]} \times \text{Activity}(T)$$

In the equation, the activity at temperature T is multiplied by a ratio of the propylene concentration at 67° C. to the propylene concentration at temperature T. The resulting normalized activity (A), adjusted for the decrease in propylene concentration with temperature increase, may be used for comparison of catalyst activities under varying temperature conditions. The correction factors are listed below for the conditions used in the liquid phase polymerization.

| 67° C. | 85° C. | 100° C. | 115° C. | 130° C. | 145° C. |
|---|---|---|---|---|---|
| 1.00 | 1.42 | 1.93 | 2.39 | 2.98 | 3.70 |

The correction factor assumes that polymerization activity increases linearly with propylene concentration under the conditions employed. The correction factor is a function of the solvent or diluent used. For example, the correction factors listed above are for a common $C_{6-10}$ aliphatic hydrocarbon mixture (Isopar™ E, available from Exxon Chemical Company). Under gas phase polymerization conditions, monomer solubility is normally not a factor and activity is generally uncorrected for temperature difference. That is, activity and normalized activity are the same.

The "normalized activity ratio" is defined as $A_T/A_{67}$, where $A_T$ is the activity at temperature T and $A_{67}$ is the activity at 67° C. This value can be used as an indicator of activity change as a function of temperature. For example, an $A_{100}/A_{67}$ equal to 0.30 shows that the catalyst activity at 100° C. is only 30 percent of the catalyst activity at 67° C.

It has been found that at 100° C., an $A_{100}/A_{67}$ ratio of 35% or less yields a catalyst system that is self-extinguishing system.

Not wishing to be bound by any particular theory, it is believed that the Al/SCA ratio of 0.5:1 to 4:1 provides a sufficient amount of aluminum to support the polymerization reaction at normal polymerization temperatures. However, at elevated temperature (due to a temperature excursion or a process upset, for example), more aluminum reacts with other catalyst components. This leads to an aluminum deficiency which slows the polymerization reaction. The aluminum deficiency causes a corresponding reduction in the number of electron donors complexed with the aluminum. The free electron pairs of the non-complexed donors poison the catalyst system, which self-extinguishes the reaction.

In any of the foregoing embodiments, the SCA may include from about 60 mole percent to about 95 mole percent of the ALA and from about 5 mole percent to about 40 mole percent of the SLA (or non-silane composition).

The molar ratio of aluminum to SDA may be from 150:1 to 1.25:1 (or any value therebetween), or 80:1 to 1.5:1, or 40:1 to 1.67:1, or 20:1 to 2.5:1, or 13:1 to 5:1.

The molar ratio of aluminum to ALA may be 20:1 to 0.5:1 (or any value therebetween), or 6.7:1 to 0.5:1, or 5.7:1 to 0.52:1, or 5:1 to 0.62:1, or 4.4:1 to 0.71:1, or 5.3:1 to 0.5:1. The molar ratio of SCA to titanium may be from about 5:1 to about 100:1. In an embodiment, the SCA to titanium molar ratio is 30:1.

In an embodiment, another catalyst composition is provided. The catalyst composition includes one or more Ziegler-Natta procatalyst compositions having one or more transition metal compounds and an internal electron donor, one or more aluminum containing cocatalysts and a selectivity control agent (SCA). The internal electron donor may be any internal electron donor as disclosed herein. The SCA is a mixture of an SDA that is a non-silane composition and an ALA that is a poly(alkene glycol) ester. The catalyst composition is self-extinguishing.

The poly(alkene glycol) ester can be any poly(alkene glycol) ester disclosed herein. Nonlimiting examples of suitable poly(alkene glycol) esters include (poly)(alkylene glycol) mono- or diacetates; (poly)(alkylene glycol) mono- or di-myristates; fatty acid esters such as (poly)(alkylene glycol) mono- or di-laurates; (poly)(alkylene glycol) mono- or di-oleates; glyceryl tri(acetate), glyceryl tri-ester of $C_{2-40}$ aliphatic carboxylic acids; poly(ethylene glycol) esters; glycerides of linoleic, oleic, palmitic and stearic acids, and mixtures thereof; and any combination of the foregoing. The poly(alkene glycol) ester can be a mixture of fatty acid esters. In an embodiment, the fatty acid ester is a coco fatty acid ester commercially available as S-191 from Chem Service, Inc., West Chester, Pa.

The non-silane composition can be any non-silane composition disclosed herein. For example, the non-silane composition can be any diether composition, succinate composition, and/or piperidine composition as previously disclosed herein.

In an embodiment, the catalyst composition has a molar ratio of aluminum to total SCA from about 100:1 to about 0.5:1, or from about 50:1 to 0.75:1, or from about 20:1 to 5:1, or from about 18:1 to about 15:1.

In an embodiment the poly(alkene glycol) ester is a fatty acid ester and the SDA non-silane composition is a diether composition. The diether composition can be 2,2diisobutyl-1,3-dimethoxypropane.

In an embodiment, the poly(alkene glycol) ester is a fatty acid ester and the SDA non-silane composition is a succinate composition. The succinate composition can be diethyl 2,3-diisopropylsuccinate.

In an embodiment, the poly(alkene glycol) ester is a fatty acid ester and the SDA non-silane is a piperidine composition. The piperidine composition can be 2,2,6,6-tetramethylpiperidine.

The present catalyst system further yields a polypropylene composition with high stiffness, a high melt flow rate, and high isotacticity (i.e., a low xylene solubles content). Not wishing to be bound by any particular theory, it is believed that the aluminum species to SCA molar ratio results in a catalyst composition that replicates the self-extinguishing property of third generation catalysts which utilize benzoic acid esters as electron donors. Benzoic acid esters, such as ethyl p-ethoxybenzoate (PEEB), however, impart an undesirable odor to resultant polymers such as polypropylene. While using a fourth generation catalyst which may contain a phthalate internal donor, the present catalyst composition may or may not contain a benzoic acid ester. The embodiments of catalyst compositions without a benzoic acid ester may correspondingly produce an odor-free polypropylene. In other words, the present catalyst system replicates PEEB-based catalyst systems yet produce an odor-free polypropylene composition. In addition, the present catalyst composition meets or exceeds the activity of conventional fourth generation catalysts, and in general, exceed the activity of the third generation catalysts.

In an embodiment, a polymerization process is provided. The polymerization process includes contacting propylene with a catalyst composition in a polymerization reactor. The catalyst composition may be any of the foregoing catalyst compositions. The method includes maintaining the molar ratio of aluminum to total SCA from about 0.5:1 to about 4:1. In other words, the aluminum to total SCA ratio is adjusted throughout the polymerization process to hold or control this ratio in the range of 0.5:1 to 4:1, or from 1:1 to 3:1, or 3:1. The polymerization process further includes forming a propylene containing polymer.

In an embodiment, the polymerization process may also include maintaining, adjusting, or otherwise controlling the aluminum to titanium ratio at about 45:1. Thus, the aluminum to SCA ratio is controlled by adjusting the amount SCA components introduced into the reaction while maintaining the aluminum at a constant amount.

The propylene containing polymer formed by way of the polymerization process may be a polypropylene homopolymer or a copolymer of propylene and one or more comonomers. The comonomer may be an alpha-olefin having from 2-12 carbon atoms. Nonlimiting examples of suitable comonomers include ethylene, 1-butene, 1-hexene, 4-methyl pentene, 1-heptene, and 1-octene. Consequently, the polypropylene composition may be a polypropylene homopolymer or a polymer with a propylene monomer and one or more comonomers. In an embodiment, the propylene containing polymer has a xylene solubles content from about 0.5% to about 6.0% by weight, or from about 2.0% to about 5.0% by weight.

In an embodiment, the polymerization process includes extinguishing, with the catalyst composition, the polymerization process or reaction when the temperature in the polymerization reactor is greater than about 100° C.

The polymerization process may be a gas phase, a slurry, or a bulk polymerization process, operating in one or more than one reactor. A suitable gas phase polymerization process includes the use of condensing mode as well as super condensing mode wherein gaseous components including added inert low boiling compounds are injected into the reactor in liquid form for purposes of heat removal. When multiple reactors are employed, it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, another SCA mixture, or individual alkoxysilanes and/or one or more activity limiting agents.

In an embodiment, the polymerization process is conducted in two reactors in which two olefins, such as propylene and ethylene, are contacted to prepare an impact copolymer. Polypropylene is prepared in the first reactor and a copolymer of ethylene and propylene is prepared in the second reactor in the presence of the polypropylene from the first reactor. Regardless of the polymerization technique employed, it is understood that the SCA, the procatalyst, and/or the cocatalyst thereof may be contacted in the absence of other polymerization components, especially monomer, prior to addition to the reactor. In an embodiment, the foregoing dual polymerization processes are solution polymerizations.

The temperature of the polymerization reactor is from 40 to 130° C. or from 60 to 100° C., or from 65° C. to 80° C. The foregoing temperatures are average temperatures of the reaction mixture measured at the reactor walls. Isolated regions of the reactor may experience localized temperatures that exceed the foregoing limits.

By way of example and not limitation, examples of the present disclosure will now be given.

EXAMPLES (1) Catalysts

A: A commercial SHAC™ 320 catalyst containing 2.59 wt % Ti.

B: (1) 12.00 g of MagTi precursor was contacted with 175 ml of $TiCl_4$ solution in MCB (1:1 vol:vol) and then 2.60 ml of DiBP. The mixture was heated to 115° C. and maintained at the temperature for 60 minutes followed by filtration to remove the solvent. (2) 175 ml of the $TiCl_4$ solution in MCB (1:1 vol:vol) was added to the solid, the mixture was maintained at 115° C. for 30 minutes and then filtered. This procedure was repeated once. (3) The resulting solid was washed with 200 ml of isooctane at 25° C. 3 times followed by filtration. The solid was then dried with a $N_2$ flow. Analysis by X-ray fluorescence showed the solid catalyst contains 3.35 wt % Ti.

C: (1) 12.00 g of MagTi precursor was contacted with 175 ml of $TiCl_4$ solution in MCB (1:1 vol:vol) and then 4.80 ml of 1-ethoxy-2-n-pentoxybenzene (EPB). The mixture was heated to 110° C. and maintained at the temperature for 60 minutes followed by filtration to remove the solvent. This procedure was repeated twice. (2) The resulting solid was washed with 200 ml of isooctane at 25° C. 3 times followed by filtration. The solid was then dried with a $N_2$ flow. Analysis by X-ray fluorescence showed the solid catalyst contains 4.45 wt % Ti.

D: (1) 12.00 g of MagTi precursor was contacted with 175 ml of $TiCl_4$ solution in MCB (1:1 vol:vol) and then 2.48 ml of diethyl 2,3-diisopropylsuccinate (DEDiPS). The mixture was heated to 115° C. and maintained at the temperature for 60 minutes followed by filtration to remove the solvent. (2) 175 ml of the $TiCl_4$ solution in MCB (1:1 vol:vol) was added to the solid, the mixture was maintained at 115° C. for 30 minutes and then filtered. This procedure was repeated once. (3). The resulting solid was washed with 200 ml of isooctane at 25° C. 3 times followed by filtration. The solid was then dried with a $N_2$ flow. Analysis by X-ray fluorescence showed the solid catalyst contains 3.75 wt % Ti.

(2) Polymerization

Polymerization reaction was carried out in Parallel Polymerization Reactors (by Symyx)

The particle size of the catalyst powder was reduced by stirring the catalyst solid with a stir bar for 30-45 minutes. Catalyst slurries were then prepared in toluene. The concentration of the slurries and loadings for each catalyst are listed below.

| Catalyst | Ti (wt %) | Slurry Concentration (μg/mL) | Loading (μg/reactor) |
|---|---|---|---|
| A | 2.59 | 247 | 68.0 |
| B | 3.35 | 191 | 52.5 |
| C | 4.45 | 144 | 39.5 |
| D | 3.75 | 170 | 46.9 |

All SCAs and ALAs were diluted to 0.005 M in Isopar E™, except S-191 which was dissolved in toluene before injection into the PPRs. TEA1 was prepared in Isopar E™ and used as either 0.02 or 0.1M solutions.

Purged PPR reactors were heated to 50° C. TEA1 and Isopar E™ make-up solvent were added to each reactor, followed by the addition of $H_2$ to a stabilized pressure of 5 psig. Reactors were heated to the assigned temperature (67, 100 or 115° C.). Propylene was added to 100 psig and allowed to stabilize for 10 min. To each reactor was added SCA or a mixture of SDA & ALA and a 500 ul of Isopar E™ chaser and immediately followed by the addition of catalyst (275 ul) and a 500 ul Isopar E™ chaser. Reactions were quenched with $CO_2$ after 60 minutes or when the maximum relative conversion of 110 was reached.

(4) XS Measurement

Percent xylene solubles (% XS) in polypropylene (PP) is a material property listed on many product specification sheets and the measurement procedure is specified by ASTM method D 5492-98. The method determines the fraction of a PP sample which is soluble in o-xylene at 25° C. The soluble fraction has a good correlation to the percent amorphous fraction in PP. The amorphous fraction content is closely related to performance characteristics of the final product and is also critical to process control. The new XS screen is integrated into the Midland Core R&D Organic Chemistry & Catalysis High Throughput Laboratory workflow. The tool is used to measure % polypropylene (PP) solubles in trichlorobenzene (% TCBs) and correlate this value with % xylene solubles based on PP standards. The system design is based on the Cavro liquid manipulator footprint and is housed with custom-made peripherals to manipulate, cap, filter, and analyze hot polymer solutions. The Cavro robotic system and a Polymer Char IR4 filter based infrared detector to determine polymer solution concentrations are interfaced to a personal computer. The versatility of the unit enables it to be used to dilute polymer samples and create replicate samples in a stand-alone mode. Forty-eight samples can be processed in 10 hours which is a ~10× increase compared to similar manually ASTM prepared methods using as little as 30 mg vs. the standard 2 gm of sample. In general the diluted samples are heated to and held at 160° C. during analysis, individual samples are then transferred to a sampling block which heats the sample to 175° C. for analysis via the IR4 infrared detector. When all samples have been analyzed, the sample block is cooled to 40° C. for 1 hour, filtered, warmed to 60° C. to keep remaining polypropylene in solution and then reanalyzed at 175° C. with the IR4. The difference in before and after readings provides the bases for the final % TCB value, which was then converted into XS %.

TABLE 1

Performance of Phthalate-Based Catalyst Systems Using Single Non-Silane SDAs*

| SDA | ALA | Al/(SDA + ALA) (mol/mol) | SDA/ALA/Ti (mol/mol/mol) | SDA/ALA (mol %) | Temp (° C.) | Activity (kg/g/hr) | | | | Average Activity (kg/g/hr) | Normalized Activity (kg/g/hr) | $A/A_{67}$ (%) | Average XS (%) |
|---|---|---|---|---|---|---|---|---|---|---|---|---|---|
| TMPY | None | 3.0 | 30/0/1 | 100/0 | 67 | 7.44 | 6.72 | | | 7.08 | 7.08 | 100 | 4.39 |
| | | | | | 100 | 11.81 | 12.44 | 12.73 | | 12.33 | 23.79 | 336 | 4.62 |
| | | | | | 115 | 2.33 | 2.52 | 2.00 | | 2.28 | 5.46 | 77 | 7.26 |
| TMPY | PEEB | 3.0 | 1.5/28.5/1 | 5/95 | 67 | 3.35 | 5.02 | 4.68 | | 4.35 | 4.35 | 100 | |
| | | | | | 100 | 0.25 | 0.20 | 0.25 | | 0.23 | 0.45 | 10 | 5.63 |
| | | | | | 115 | 0.05 | 0.05 | 0.05 | | 0.05 | 0.12 | 3 | |
| TMPY | DiBDMP | 3.0 | 1.5/28.5/1 | 5/95 | 67 | 5.34 | 4.68 | 6.53 | | 5.52 | 5.52 | 100 | 4.83 |
| | | | | | 100 | 1.47 | 1.35 | 1.74 | 1.50 | 1.52 | 2.92 | 53 | 3.78 |
| | | | | | 115 | 0.66 | 0.65 | 0.60 | 0.63 | 0.64 | 1.52 | 28 | 2.95 |
| TMPY | None | 16.7 | 30/0/1 | 100/0 | 67 | 11.15 | 8.53 | 8.01 | | 9.23 | 9.23 | 100 | 4.62 |
| | | | | | 100 | 17.29 | 9.24 | 5.72 | | 10.75 | 20.75 | 225 | 4.91 |
| | | | | | 115 | 1.55 | 1.74 | 1.66 | | 1.65 | 3.94 | 43 | 7.21 |
| TMPY | PEEB | 16.7 | 1.5/28.5/1 | 5/95 | 67 | 7.59 | 7.42 | 8.25 | | 7.75 | 7.75 | 100 | 6.71 |
| | | | | | 100 | 1.72 | 1.79 | 1.71 | | 1.74 | 3.36 | 43 | |
| | | | | | 115 | 0.59 | 0.65 | 0.47 | | 0.57 | 1.36 | 18 | |
| DEDiPS | None | 16.7 | 30/0/1 | 100/0 | 67 | 4.21 | 2.48 | 2.61 | | 3.10 | 3.10 | 100 | 13.3 |
| | | | | | 100 | 0.30 | 0.46 | 0.39 | | 0.38 | 0.74 | 24 | |
| | | | | | 115 | 0.17 | 0.20 | 0.17 | | 0.18 | 0.43 | 14 | |
| DEDiPS | S-191 | 16.7 | 3/27/1 | 10/90 | 67 | 2.62 | 3.30 | 2.20 | | 2.71 | 2.71 | 100 | 13.8 |
| | | | | | 100 | 0.05 | 0.05 | 0.05 | | 0.05 | 0.10 | 4 | |
| | | | | | 115 | 0.05 | 0.05 | 0.05 | | 0.05 | 0.12 | 4 | |
| DiBDMP | None | 16.7 | 30/0/1 | 100/0 | 67 | 8.12 | 6.68 | 5.13 | | 6.64 | 6.64 | 100 | |
| | | | | | 100 | 1.44 | 1.34 | 1.00 | | 1.26 | 2.43 | 37 | 6.09 |
| | | | | | 115 | 0.55 | 0.57 | 0.47 | | 0.53 | 1.27 | 19 | |

TABLE 1-continued

| | | | | | | | | | | | | | |
|---|---|---|---|---|---|---|---|---|---|---|---|---|---|
| DiBDMP | S-191 | 16.7 | 1.5/28.5/1 | 5/95 | 67 | 3.64 | 5.69 | 5.83 | 5.05 | 5.05 | 100 | 6.92 |
| | | | | | 100 | 0.07 | 0.06 | 0.06 | 0.06 | 0.12 | 2 | |
| | | | | | 115 | 0.06 | 0.07 | 0.06 | 0.06 | 0.15 | 3 | |

*A commercial SHAC ™ 320 catalyst (Catalyst A) was used.
TMPY   2,2,6,6-tetramethylpiperidine
DEDiPS  Diethyl 2,3-diisopropylsuccinate
DiBDMP  2,2-Diisobutyl-1,3-dimethoxypropane
PEEB    Ethyl p-Ethoxybenzoate
S-191   POE (15) coco fatty acids ester

TABLE 2

Performance of Non-Phthalate-Based Catalyst Systems Using Single Non-Silane SCAs*

| SDA | ALA | Al/(SDA + ALA) (mol/mol) | SDA/ALA/Ti (mol/mol/mol) | SDA/ALA (mol %) | Temp (° C.) | Activity (kg/g/hr) | | | Average Activity (kg/g/hr) | Normalized Activity (kg/g/hr) | A/A$_{67}$ (%) | Average XS (%) |
|---|---|---|---|---|---|---|---|---|---|---|---|---|
| TMPY | None | 3.0 | 30/0/1 | 100/0 | 67 | 13.78 | 10.29 | | 12.04 | 12.04 | 100 | 14.23 |
| | | | | | 100 | 5.67 | 5.35 | 4.35 | 5.12 | 9.89 | 82 | 13.2 |
| | | | | | 115 | 2.38 | 2.68 | 2.45 | 2.50 | 5.98 | 50 | 23.18 |
| TMPY | PEEB | 3.0 | 1.5/28.5/1 | 5/95 | 67 | 8.45 | 8.50 | | 8.48 | 8.48 | 100 | 8.01 |
| | | | | | 100 | 0.06 | 0.56 | 0.69 | 0.62 | 1.19 | 14 | |
| | | | | | 115 | 0.31 | 0.19 | 0.23 | 0.24 | 0.58 | 7 | |
| TMPY | DEDiPS | 3.0 | 1.5/28.5/1 | 5/95 | 67 | 6.17 | 6.51 | 8.66 | 7.11 | 7.11 | 100 | 5.93 |
| | | | | | 100 | 1.10 | 0.93 | 1.09 | 1.04 | 2.01 | 28 | |
| | | | | | 115 | 0.48 | 0.46 | 0.52 | 0.49 | 1.16 | 16 | |

*A catalyst (Catalyst C) containing 1-ethoxy-2-n-pentoxybenzene was used.
TMPY   2,2,6,6-tetramethylpiperidine
DEDiPS  Diethyl 2,3-diisopropylsuccinate
PEEB    Ethyl p-Ethoxybenzoate

TABLE 3

Performance of Catalyst Systems Using Mixed Catalysts*

| SDA | ALA | Al/(SDA + ALA) (mol/mol) | SDA/ALA/Ti (mol/mol/mol) | SDA/SLA (mol %) | Temp (° C.) | Activity (kg/g/hr) | | | Average Activity (kg/g/hr) | Normalized Activity (kg/g/hr) | A/A$_{67}$ (%) | Average XS (%) |
|---|---|---|---|---|---|---|---|---|---|---|---|---|
| TMPY | None | 3.0 | 30/0/1 | 100/0 | 67 | 9.54 | 10.90 | 7.74 | 9.39 | 9.39 | 100 | 4.94 |
| | | | | | 100 | 1.54 | 2.48 | 1.44 | 1.82 | 3.51 | 37 | 8.87 |
| | | | | | 115 | 0.90 | 1.00 | | 0.95 | 2.27 | 24 | 9.59 |
| TMPY | PEEB | 3.0 | 1.5/28.5/1 | 5/95 | 67 | 6.01 | 5.90 | 6.32 | 6.08 | 6.08 | 100 | 4.99 |
| | | | | | 100 | 0.51 | 0.41 | 0.45 | 0.46 | 0.88 | 15 | |
| | | | | | 115 | 0.10 | 0.12 | 0.13 | 0.12 | 0.28 | 5 | |

*A catalyst mixture containing a DiBP catalyst (Catalyst B) and a DEDiPS catalyst (Catalyst D) in 1/1 (wt/wt) ratio was used.
TMPY   2,2,6,6-tetramethylpiperidine
PEEB    Ethyl p-Ethoxybenzoate For purposes of United States patent practice, the contents of any patent, patent application or publication referenced herein are hereby incorporated by reference in their entirety herein, especially with respect to the disclosure of structures, synthetic techniques and general knowledge in the art. It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A catalyst composition for polymerization of propylene comprising:
   one or more Ziegler-Natta procatalyst compositions comprising a mixed magnesium/titanium compound and an internal electron donor comprising diisobutyl phthalate;
   one or more aluminum containing cocatalysts; and
   a non-silane selectivity control agent (SCA) comprising a mixture at ethyl p-ethoxy benzoate activity limiting agent (ALA) and 2,2,6,6-tetramethylpiperidine selectivity determining agent (SDA), wherein the mole percent of ALA is greater than the mole percent of SDA;
   wherein the ALA is present in an amount from 60 mole percent to 95 mole percent of total SCA, and the SDA is present in an amount from 5 mole percent to 40 mole percent of total SCA; and
   wherein the catalyst composition exhibits a normalized activity ratio A100/A67 of 35% or less, wherein the normalized activity ratio is defined as A100/A67 where A100 is the activity at temperature 100° C. and A67 is die activity at 67° C. and activity is defined as the weight of polymerized propylene per weight catalyst composition per hour at the indicated temperature, and wherein a molar ratio of aluminum to total SCA is from 0.5:1 to 4:1; whereby the catalyst composition is self-extinguishing.

2. The catalyst composition of claim 1 wherein the catalyst composition further has a normalized activity ratio A115/A67 from 3% to 5%, wherein the normalized activity ratio is defined as A115/A67, where A115 is the activity at temperature 115° C. and A67 is the activity at 67° C.

3. The catalyst composition of claim 1 wherein the catalyst composition has a normalized activity ratio A100/A67 of 30% or less, wherein the normalized activity ratio is defined as A100/A67, where A100 is the activity at temperature 100° C. and A67 is the activity at 67° C.

* * * * *